March 13, 1962   F. A. KNOPPS   3,024,782
HEATED SEAT
Filed Jan. 13, 1958

INVENTOR
FRANCIS A. KNOPPS
BY
Williamson, Schroeder, Adams & Palmatier
ATTORNEYS 3,024,782
HEATED SEAT
Francis A. Knopps, R.R. 5, Menomonie, Wis.
Filed Jan. 13, 1958, Ser. No. 708,459
4 Claims. (Cl. 126—208)

This invention relates to a portable and heated seat for use by sportsmen such as hunters while waiting for game to appear.

An object of my invention is the provision of a new and improved heated seat which is of simple and inexpensive construction and which is constructed to supply heat to several areas of the body of a person who sits on the seat.

Another object of my invention is the provision of a novel heated seat which supplies such an amount of heat to the surface upon which a person sits as to warm his body without overheating or burning him.

A further object of my invention is the provision of an improved heated seat wherein a burner is confined and suspended for pendulum swinging into plumb position at such a position within a receptacle body of the seat so as to make possible even distribution of heat over the surface area upon which a person sits and to permit successive uses of the heated air and combustion gases for warming said surface area and then circulating up into the person's clothing.

A still further object of my invention is the provision of a multi-compartmented device to function as a heated seat for use by a sportsman and wherein one compartment confines a heat source for supplying heat to the body of the person and another compartment is maintained in cool condition for insulating the heated compartment from the ground and for storing game and the like.

These and other objects and advantages of my invention will more fully appear from the following description made in connection with the accompanying drawings wherein like reference characters refer to the same parts throughout the several views and in which.

Figure 1:
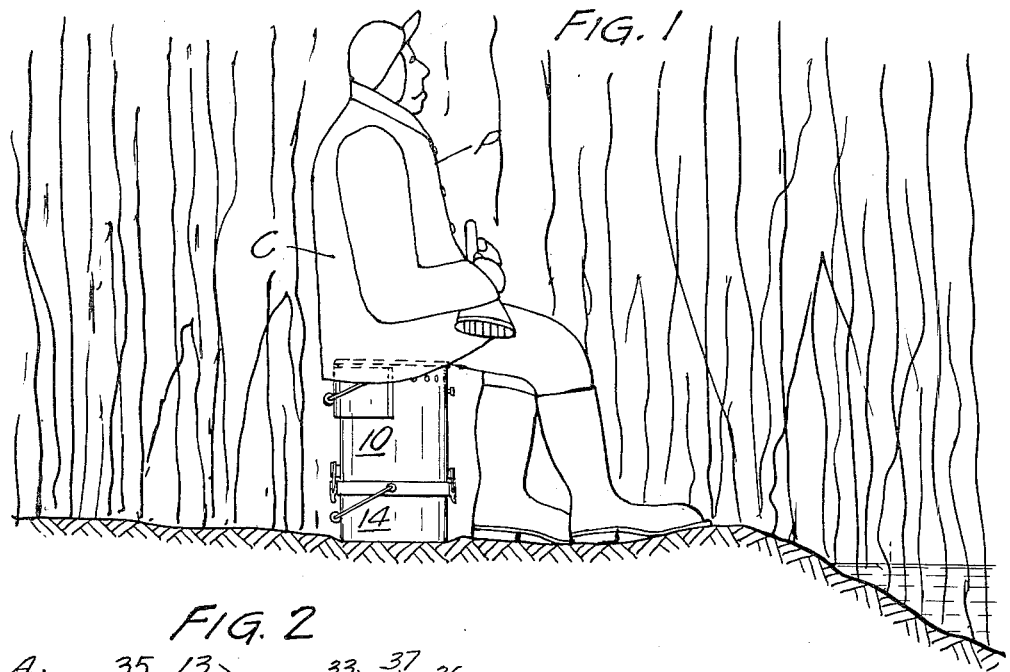
FIG. 1 is an elevation view of the invention showing the use thereof.

One form of the invention is shown in the drawings and is described herein.

The present invention includes a hollow rigid body which is indicated in general by numeral 10 and includes an upright cylindrical sidewall 11 and a bottom 12 integral therewith and constructed similar to a pail, and a removable top 13. The body 10 is also provided with ground-engaging support means, consisting, in the form shown, of a receptacle 14 telescopically related to and secured to the bottom of rigid body 10 and defining a compartment 15 for cooled storage of game, such as fish and the like.

The sidewall 11 has a plurality of air and combustion gas discharging apertures 16 spaced below the upper edge thereof, and a plurality of air inlet apertures 17 adjacent the lower portion of the wall. Means are provided for adjusting the air flow through the apertures 16 and in the form shown, such means include a substantially cylindrical plate or band 18 extending around the internal periphery of the sidewall at the apertures 16 and having a plurality of apertures 19 spaced to register with the apertures 16, the cylindrical plate 18 is supported for sliding in relation to the sidewall 11 by means of a plurality of clips 20 which may be affixed as by welding to the inner side of the sidewall 11, a handle or control button 21 is affixed to the cylindrical plate 18 as by rivet 22, and the botton 21 projects through an elongated slot 23 in the sidewall 11, which extends through an arc around the periphery thereof so as to permit the handle 21 to be moved peripherally of the wall 11 to move the closure plate 18 and thereby move the apertures 19 out of registering relation with the apertures 16 for partially or completely closing the apertures 16.

A baffling plate 24 extends around the exterior side of the sidewall 11 in opposed relation with the apertures 16 therein, and the baffling plate 24 projects upwardly above the apertures 16 for directing the air and combustion gases discharged therefrom upwardly in the direction of arrow A so as to circulate the air and combustion gases which are discharged from the apertures upwardly beneath the coat C of the person P who sits upon the top 13. The baffling plate 24 may be secured to the sidewall by any suitable means and in the form shown, the plate 24 is affixed at its opposite ends to the wall 11 by means of rivets 25.

A burner 26 is provided in the interior compartment or chamber 27 of the hollow body 10 to produce a flame F for heating the air and producing hot combustion gases therein. The burner 26 may contain any suitable type of fuel such as alcohol but it is preferred that the fuel be of such a type as to burn with a minimum of smoking.

Means are provided for suspending the burner 26 in the hollow body 10 and adjacent the top thereof and in spaced relation with the bottom thereof. A framework 28 is supported by a pair of pivots 29 which are disposed in diametrically opposed relation with each other and are supported on brackets 30 which may be affixed as by welding to the interior of the sidewall 11. A band 31 may encircle the neck portion of the burner 26 and be removably attached thereto, and the band 31 will have a pair of pivot pins 32 on opposite sides thereof for pivotal mounting on the framework 28. The swing axis provided by the pivot pins 32 is at right angles to the axis of swinging of framework 28 so as to permit free pendulum swinging of the burner 26 to plumb position.

The top 13 includes an upper plate 33 and a lower plate 34 which is spaced downwardly from the plate 33 and which has a plurality of apertures 35 therein. Sealing means 36 is provided between the periphery of plate 34 and the upper plate 33, and in the form shown, said sealing means 36 consist in peripheral edge portion of the lower plate 34 which is oriented vertically and is affixed as by welding to the plate 33. The plates 33 and 34 define an air and combustion gas circulating compartment 37 wherein air and combustion gases pass along the plate 33 for transferring heat thereto and to the body of the person sitting on the top 13. The plate 34 has a plurality of closure elements 38 movable into and out of covering relation with the apertures 35 for closing or partially closing the apertures, and in the form shown, the closure elements 38 are swingably secured to the plate 34 as by rivets 39.

The receptacle 14 has its open top in telescopic relation with the slightly diminished lower edge portion 40 of the sidewall 11 to provide a substantially sealed relation between the receptacle 14 and the hollow body 10. A plurality of fastening devices 41 are provided on the receptacle 14 in telescopic relation with the hollow body 10.

A carrying handle or bail 42 is secured to the upper portion of sidewall 11 for carrying the heated seat to the place of usage. A second handle or bail 43 is swingably connected with the receptacle 14 to facilitate carrying of the receptacle 14 when the same is used separately from the hollow body 10.

Figure 2:
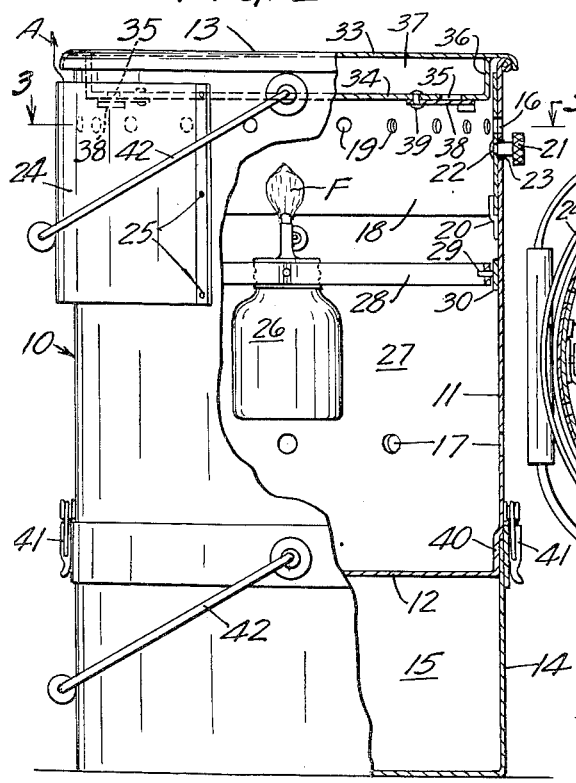
FIG. 2 is an elevation view, enlarged, in comparison to FIG. 1, of the invention, and being shown partly in section for clarity of detail.
Figure 3:
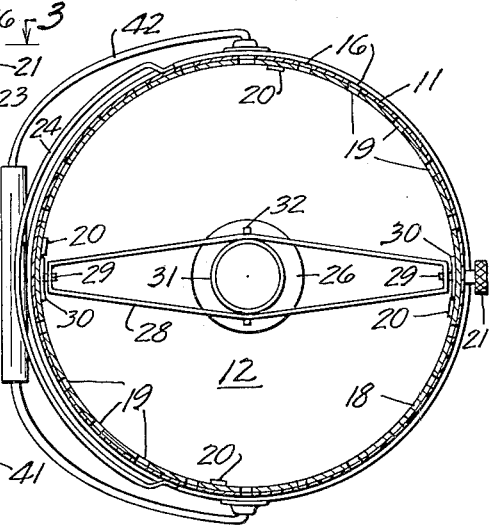
FIG. 3 is a transverse section view taken on a substantially horizontal plane as indicated at 3—3 in FIG. 2.

In the use of the present invention, the top 13 will be removed to facilitate lighting of the burner 26, and will then be replaced in the position shown in FIG. 2. Because the flame F is disposed closely adjacent the top, there will be some direct heating of the plate 34 and a resultant heating of the air in the compartment 37. The air heated by the flame F and the hot combustion gases will also circulate through the compartment 37 and apertures 35 to provide uniform heating across the entire area of the top plate 33. The circulating air and combustion gases will also pass outwardly from the apertures 16 and be directed upwardly by the baffle plate 24 and beneath the person's coat C which will ordinarily be draped around the outside of baffle plate 24 in the fashion shown in FIG. 1, so as to supply heat to the body of the person within his coat. As illustrated, the spacing between the plate 24 and the sidewall 11 at the lower edge of plate 24 will permit downward flow of gas from the aperture 19 in the event the person should tightly wrap his coat around his body and around the baffle plate 24, thus preventing or restricting the normal upward flow of gas. By adusting the closure elements 38 and by adjusting the plate 18, the rate of flow of air and combustion gases through the chamber 27 and through the compartment 37 may be adjusted so as to suit the needs of the person. It should be understood that frequently, if the device is used by a hunter, the device may be placed upon uneven ground, and even if the general body 10 is inclined, the burner 26 will remain in upright condition and because of the close proximity of the flame F and the lower plate 34 of the top 13, the heat will be supplied from the flame in substantially the same manner as if the entire body 10 were in an upright position. The heat from the flame F is applied in greatest concentration at the central portion of plate 34 regardless of the inclination of the rigid body 10, provided, of course, that the body 10 is maintained in such a position that a person may be seated on the top. The heating of the top plate 33 will be evenly distributed so as to warm all portions thereof substantially equally. It should further be noted that if the entire device should be tipped over, the burner 26 will swing about the pivots 29 and 32 and remain in upright condition.

While the device is in use, the hunter may shoot or catch some game, and in that case, the game may be placed in the receptacle 14 for cool storage. It should be understood that the receptacle 14 engages the cool ground, and that the heating within the chamber 27 will be virtually non-effective for heating the compartment 15 within the receptacle 14.

It will be seen that I have provided a new and improved device for supporting and heating the body of a person by heating, to the desired degree, the surface upon which the person sits, and also by circulating the air and combustion gases which has heated said surface outwardly and upwardly beneath the person's coat.

It will, of course, be understood that various changes may be made in the form, details, arrangement and proportions of the parts without departing from the scope of our invention which consists of the matter shown and described herein and set forth in the appended claims.

What I claim is:

1. A device for supporting and heating a person, comprising a hollow rigid body having an upright and confining sidewall and a top at the upper edge of the wall and also having means for engaging the ground, said top having a pair of vertically spaced plates and sealing means interconnecting the periphery of the lower plate to the upper plate to define a gas circulating compartment therebetween, the upper plate defining a surface upon which the person may be seated, the lower plate having a plurality of apertures adjacent the periphery thereof and communicating between said compartment and the interior of the hollow body, the sidewall having means permitting movement of air into and upwardly through the interior of the body and including a plurality of openings adjacent the top edge for discharging heated gases, a burner in the interior of the hollow body and disposed out of vertical alignment with any of the apertures in said lower plate, and means securing the burner in the body whereby hot gases formed by operation of said burner are circulated in said compartment for heating the upper plate and transferring heat to the person's body, and the heated gases also circulate through the openings in the sidewall and around the seated person.

2. The invention set forth in claim 1 and including means on said lower plate of the top for opening and closing the apertures therein and means on the sidewall for opening and closing the openings therein whereby to vary the heating of the upper plate of said top.

3. A device for supporting and heating a person, comprising a hollow rigid body having a substantially flat and removable top upon which the person may be seated and also having an upright and substantially continuous sidewall having upper and lower portions, said lower portion having a plurality of air inlet apertures therein said upper portion having a plurality of gas discharge apertures therein, said body having a closed bottom, a burner in the hollow body, means securing the burner in the body, a ground-engaging open topped receptacle defining a storage chamber therein and being telescopically related with the bottom of the hollow body and removable therefrom the bottom of the body operating to close said receptacle, and means releaseably securing said receptacle to the hollow body whereby the receptacle chamber provides cool storage for game and the like without being affected by the heating of the burner.

4. A device for supporting and heating a person, comprising a hollow rigid body having an upright and confining sidewall and a top at the upper edge of the wall and also having means engaging the ground, said top having a pair of vertically spaced plates and sealing means interconnecting the periphery of the lower plate to the upper plate to define gas circulating compartment therebetween, the upper plate defining a surface upon which the person may be seated, the lower plate having a plurality of apertures adjacent the periphery thereof and communicating between said compartment and the interior of the hollow body, the sidewall having means permitting movement of air into and upwardly through the interior of the body and including a plurality of openings at one side of the body and adjacent the top edge of the sidewall for discharging heated gases, an upright gas-baffling plate extending partially around said one side of the body and in spaced relation with the exterior of the sidewall in opposed relation with said openings therein and extending upwardly and downwardly from said openings, and the upper and lower edges of said gas-baffling plate being spaced from the sidewall, means securing the baffling plate on the sidewall, a burner in the interior of the hollow body and disposed out of vertical alignment with any of the apertures in said lower plate, and means securing the burner in the body, whereby to heat the upper plate and direct heated gases upwardly beneath the person's coat draped over the baffling plate.

(References on following page)

References Cited in the file of this patent

UNITED STATES PATENTS

| | | |
|---|---|---|
| 408,956 | Dawson | Aug. 13, 1889 |
| 1,214,086 | Shaw | Jan. 30, 1917 |
| 2,060,364 | Chase | Nov. 10, 1936 |
| 2,359,465 | Coburn et al. | Oct. 3, 1944 |
| 2,486,780 | Fenberg | Nov. 1, 1949 |
| 2,517,254 | Steele | Aug. 1, 1950 |
| 2,698,646 | Hepworth | Jan. 4, 1955 |
| 2,803,240 | Howell | Aug. 20, 1957 |
| 2,829,635 | Teller | Apr. 8, 1958 |
| 2,845,924 | Benda | Aug. 5, 1958 |
| 2,904,031 | Scott | Sept. 15, 1959 |

FOREIGN PATENTS

| | | |
|---|---|---|
| 19,131 | Great Britain | 1911 |
| 25,249 | Switzerland | Nov. 14, 1901 |